United States Patent
Barnes et al.

(10) Patent No.: US 10,831,372 B2
(45) Date of Patent: Nov. 10, 2020

(54) METHOD AND SYSTEM FOR IMPLEMENTING AUTOMATED REPOSITORY MONITORING AND MANAGEMENT

(71) Applicant: JPMorgan Chase Bank, N.A., New York, NY (US)

(72) Inventors: James Todd Barnes, Katy, TX (US); Farhan Ahmed, Houston, TX (US); Brian J. Gordon, Dumbarton (GB); Stephen W. Terry, Brooklyn, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 16/001,219

(22) Filed: Jun. 6, 2018

(65) Prior Publication Data
US 2019/0377497 A1    Dec. 12, 2019

(51) Int. Cl.
| | |
|---|---|
| *G06F 12/00* | (2006.01) |
| *G06F 3/06* | (2006.01) |
| *G06F 11/34* | (2006.01) |
| *G06F 11/30* | (2006.01) |
| *G06F 13/00* | (2006.01) |
| *G06F 13/28* | (2006.01) |

(52) U.S. Cl.
CPC ............ *G06F 3/0608* (2013.01); *G06F 3/067* (2013.01); *G06F 3/0635* (2013.01); *G06F 11/3034* (2013.01); *G06F 11/3438* (2013.01); *G06F 11/3442* (2013.01)

(58) Field of Classification Search
CPC .... G06F 3/0608; G06F 11/3438; G06F 3/067; G06F 11/3034; G06F 3/0635; G06F 11/3442
See application file for complete search history.

(56) References Cited

U.S. PATENT DOCUMENTS

| | | | | |
|---|---|---|---|---|
| 8,745,011 | B2* | 6/2014 | Kishi | G06F 11/106 |
| | | | | 707/692 |
| 9,946,971 | B1* | 4/2018 | Kannan | G06N 5/022 |
| 2003/0220947 | A1* | 11/2003 | Doui | G06F 8/65 |
| 2006/0116981 | A1* | 6/2006 | Krimmel | G06F 11/3476 |
| 2018/0137153 | A1* | 5/2018 | Gaikwad | G06F 16/217 |

\* cited by examiner

*Primary Examiner* — Mark A Giardino, Jr.
(74) *Attorney, Agent, or Firm* — Hunton Andrews Kurth LLP

(57) ABSTRACT

An embodiment of the present invention is directed to implementing an automated repository monitoring tool. The system comprises: a plurality of repositories that are accessed by one or more applications; an interactive interface that receives one or more user inputs and displays repository monitor data; and a processor coupled to the interactive interface and configured to perform the steps comprising: identifying a storage limit for the plurality of repositories; upon exceeding the storage limit, monitoring a set of repositories for storage consumption; determining a variance amount for each of the set of repositories for a predetermined time period that exceeds a predetermined parameter; identifying at least one culprit repository based on the variance amount; automatically modifying a first state of the at least one repository to a safeguard state; and generating a notification to one or more recipients responsible for the least one repository.

20 Claims, 4 Drawing Sheets

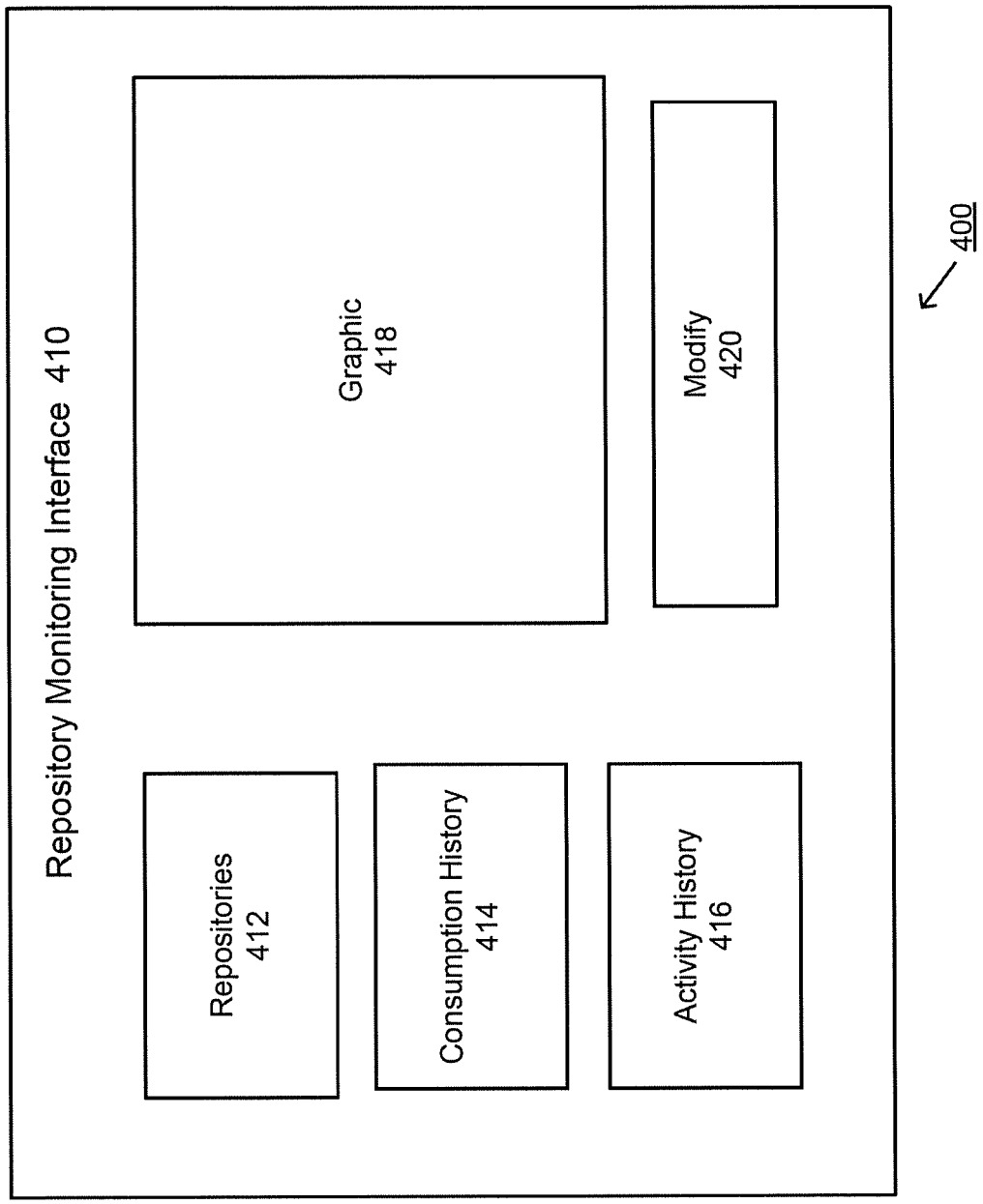

METHOD AND SYSTEM FOR IMPLEMENTING AUTOMATED REPOSITORY MONITORING AND MANAGEMENT

FIELD OF THE INVENTION

The present invention generally relates to repository management and more specifically to an automated repository and management tool.

BACKGROUND OF THE INVENTION

Software developers as well as automated processes oftentimes upload artifacts to a central repository platform that can overwhelm the system's ability to store data. For example, an automated process may be enacted that uploads a 1 GB file to a central repository platform every 10 seconds and results in a bad looping mechanism which can easily outstrip the underlying storage capacity for an entire platform. If there is an error in the script, a looping condition may cause the central repository platform to allocate nearly all of its space to these requests, thereby rendering the system and hundreds and thousands of projects unavailable for use. This could also happen when an automated API that cycles through by uploading the same binary over and over causing the underlying storage to fill up. This loop could impact thousands and thousands of developers and client facing services.

Currently, there is no mechanism in place to avoid such scenarios.

These and other drawbacks exist.

SUMMARY OF THE INVENTION

Accordingly, one aspect of the invention is to address one or more of the drawbacks set forth above. According to an embodiment of the present invention, a computer implemented system that implements an automated repository monitoring tool comprises: a plurality of repositories that are accessed by one or more applications; an interactive interface that receives one or more user inputs and displays repository monitor data; and a processor coupled to the interactive interface and configured to perform the steps comprising: identifying a storage limit for the plurality of repositories; upon exceeding the storage limit, monitoring a set of repositories for storage consumption; determining a variance amount for each of the set of repositories for a predetermined time period that exceeds a predetermined parameter; identifying at least one culprit repository based on the variance amount; automatically modifying a first state of the at least one repository to a safeguard state; and generating a notification to one or more recipients responsible for the least one repository.

According to another embodiment of the present invention, an automated computer implemented method that implements an automated repository monitoring tool comprises the steps of: identifying a storage limit for a plurality of repositories that are accessed by one or more applications; upon exceeding the storage limit, monitoring a set of repositories for storage consumption; determining a variance amount for each of the set of repositories for a predetermined time period that exceeds a predetermined parameter; identifying at least one culprit repository based on the variance amount; automatically modifying a first state of the at least one repository to a safeguard state; and generating a notification to one or more recipients responsible for the least one repository.

The computer implemented system, method and medium described herein provide unique advantages to analysts, developers, administrators and other users. The innovative Repository Monitoring Tool allows for active monitoring and detection of conditions that impair server storage across thousands and thousands of repositories. The Repository Monitoring Tool may be easily integrated with various systems and environments. These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 4 illustrates an exemplary interactive interface, according to an embodiment of the present invention.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to implementing a storage monitoring tool to discern when a critical limit of storage is reached. The limit may be configurable by platform administrators (e.g., 85%, 90%, 95% of available storage). When this value is reached, a set of processes may discern the repositories that have grown. This may be measured as a percentage increase as well as a net storage increase to determine which repositories are uploading artifacts to the system outside of normal parameters. For example, each repository may be gauged against a trending file that defines an amount of storage increase and/or decrease over its history. As a result, a repository or a set of repositories, which are deemed to be the source for an uncontrolled storage increase, may be locked in a read-only state. The read-only state then forbids further uploads but allows normal read processes to continue. In addition, the system may generate automated e-mails (or other communications) notifying a repository owner or other recipient of the modification and the administrative team of the details surrounding the process logic. The system may also invoke escalations to call-out programs to alert on-call staff to perform additional analysis and reporting.

According to an embodiment of the present invention, the process may be automated and implemented across a firm or other entity for a multitude of platforms. By locking the repository into a read-only state, the overall platform stability may be maintained while retaining core functionality for the offending repository while other repositories are unaffected. By this process, core Source Control Systems (e.g., Subversion) are able to satisfy near 100% of planned uptime for global developers. The process may be utilized on any platform that a repository or a collection may grow beyond the scope of the platform's storage capacity.

Figure 1:
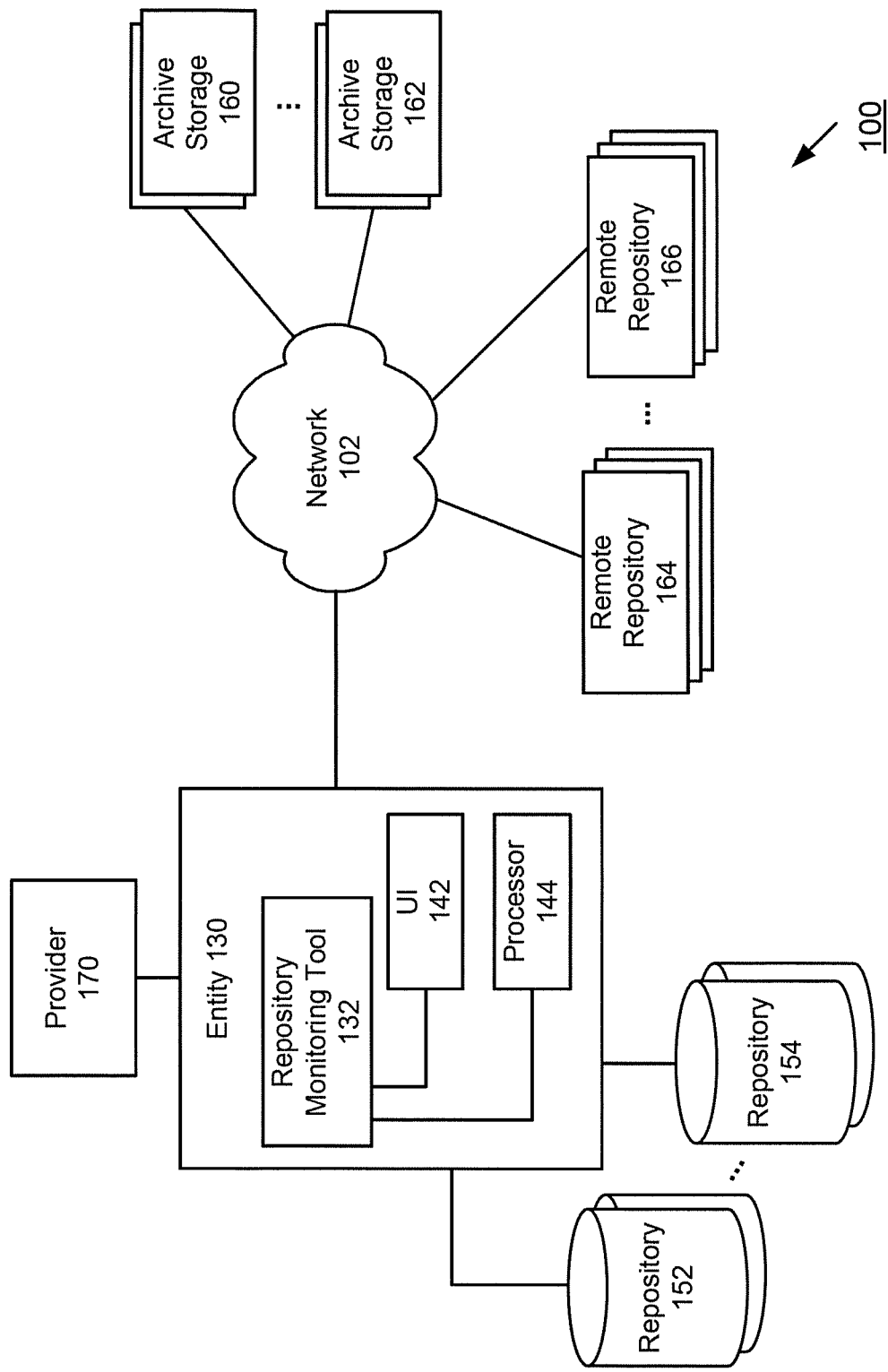
FIG. 1 illustrates a schematic diagram of a system that implements an Automated Monitoring Tool, according to an exemplary embodiment.

FIG. 1 illustrates a schematic diagram of a system that implements an Automated Repository Monitoring Tool, according to an exemplary embodiment. Entity 130 may include Repository Monitoring Tool 132 that automates and facilitates storage monitoring in accordance with the various embodiments of the present invention. Repository Monitoring Tool 132 may also incorporate modules and other functions, such as User Interface 142 and Processor 144. These modules are exemplary and illustrative, Repository Monitoring Tool 132 may interact with additional modules, a combination of the modules described and/or less modules than illustrated. While a single illustrative block, module or component is shown, these illustrative blocks, modules or components may be multiplied for various applications or different application environments. The modules and/or components may be further duplicated, combined and/or separated across multiple systems at local and/or remote locations. Other architectures may be realized.

Repository Monitoring Tool 132 may be implemented in various systems and platforms to provide automated repository monitoring and management. Entity 130 may represent any company, service or product provider, financial institution, or other user with access to repositories and other storage components. Entity 130 may communicate with local and remote repositories, represented by Local Repositories 152, 154, Remote Repositories 164, 166 and Archive Storage 160, 162. The automated monitoring features described herein may be provided by Entity 130 and/or a third party provider, represented by 170, where Provider 170 may operate with Entity 130. Each repository may represent one, tens, hundreds or even thousands and thousands of storage devices.

In accordance with the various features of an embodiment of the present invention, Repository Monitoring Tool 132 may store and manage data in other locations, such as Archive Storage 160, 162, Remote Repositories, 164, 166 as well as other components and other forms of storage.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 400 may be referenced in explaining the exemplary methods described herein.

Network 102 may be a wireless network, a wired network or any combination of wireless network and wired network. Also, Network 102 may support an Internet network, a wireless communication network, a cellular network, Bluetooth, or the like, or any combination thereof. Although Network 102 is depicted as one network for simplicity, it should be appreciated that according to one or more embodiments, Network 102 may comprise a plurality of interconnected networks, such as, for example, a service provider network, the Internet, a cellular network, corporate networks, or even home networks, or any of the types of networks. Data may be transmitted and received via Network 102 utilizing a standard networking protocol or a standard telecommunications protocol.

While FIG. 1 illustrates individual devices or components, it should be appreciated that there may be several of such devices to carry out the various exemplary embodiments. Repository Monitoring Tool 132 may be accessed using any mobile or computing device, such as a laptop computer, a personal digital assistant, a smartphone, a smartwatch, smart glasses, other wearables or other computing devices capable of sending or receiving network signals. Customer devices may have an application installed that is associated with Entity 130.

Entity 130 may be communicatively coupled to Repositories 152, 154 as well as Remote Repositories represented by 160, 162, 164 and 166. These storage components may include any suitable data structure to maintain the information and allow access and retrieval of the information. For example, the storage components may keep the data in an organized fashion. The storage may be local, remote, or a combination. Communications with the storage components may be over a network, such as Network 102, or communications may involve a direct connection between the various storage components and Entity 130, as depicted in FIG. 1. The storage components may also represent cloud or other network based storage.

Figure 2:
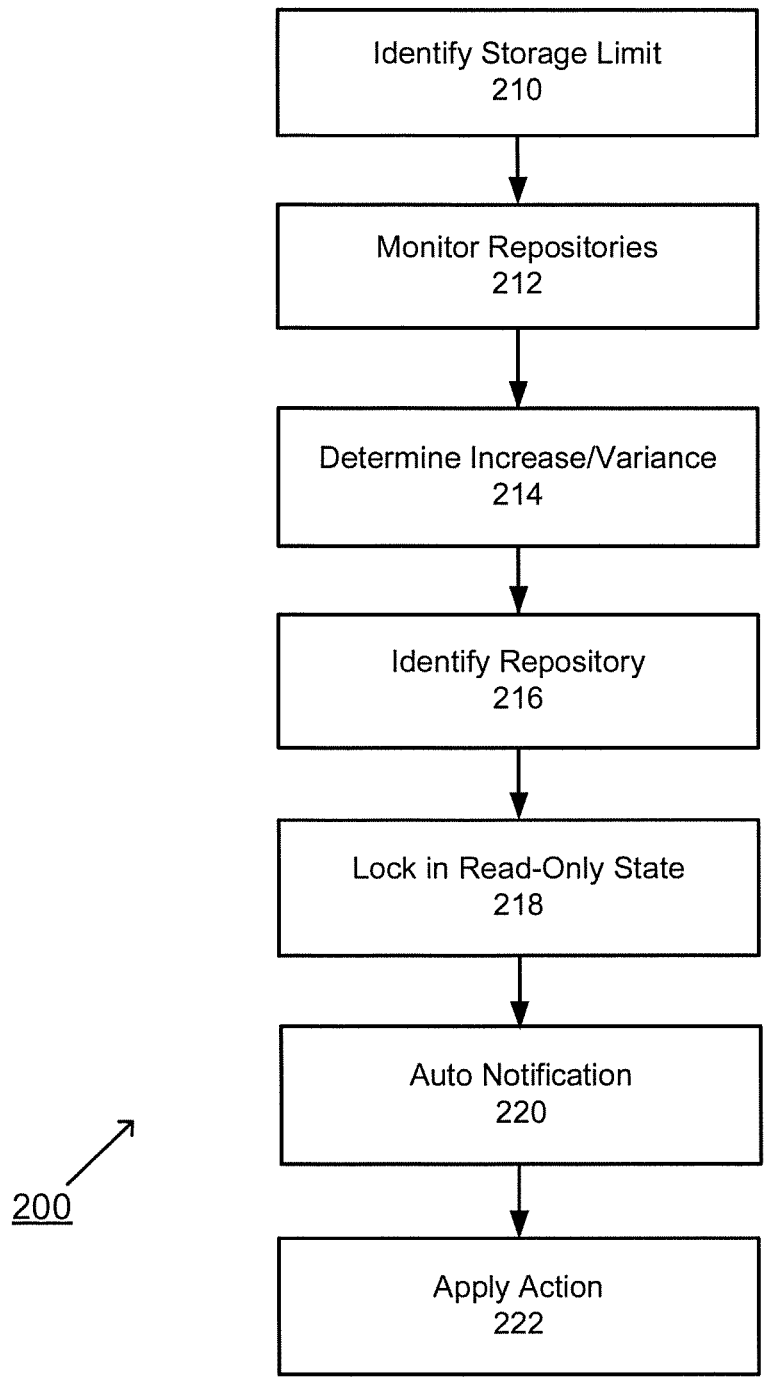
FIG. 2 is an exemplary flowchart of a method for implementing an Automated Monitoring Tool, according to an embodiment of the present invention.

FIG. 2 is an exemplary flowchart of a method for implementing an Automated Repository Monitoring Tool, according to an embodiment of the present invention. At step 210, a Repository Monitoring Tool may identify a storage limit. At step 212, a collection of repositories may be monitored. At step 214, the Repository Monitoring Tool may determine an increase or variance of storage. At step 216, the Repository Monitoring Tool may identify one or more repositories with capacity exceeding the storage limit over a period of time. At step 218, the identified repository may be modified to a read-only state. At step 220, notifications may be generated and transmitted to one or more intended recipients. At step 222, an appropriate action may be applied. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. The steps of FIG. 2 are explained in further detail below.

At step 210, a Repository Monitoring Tool may identify a storage limit. According to an embodiment of the present invention, the Repository Monitoring Tool may initiate a monitoring process based on a predetermined threshold, which may include a storage limit. The storage limit may be identified as a capacity percentage or other predetermined metric. Also, the monitoring process may be initiated by a user, e.g., operator, analyst, etc. The monitoring process may be scheduled to occur at a predetermined time, interval, triggering condition, etc. For example, the storage limit may be a percentage of capacity, such as 85%. When the storage reaches 85% of capacity, this may indicate a potential runaway condition. Also, other threshold conditions may include a percentage of change within a predetermined time period. For example, if the storage increases at a high rate (e.g., exponential rate) within a short time period, this may indicate a possible condition, even if the storage limit is below a threshold amount. Other conditions may be defined and applied.

At step 212, a collection of repositories may be monitored. For example, an entity or other provider may utilize thousands and thousands of repositories. The repositories may be located locally, remotely or a combination thereof. The monitoring process may be applied to various types of storage devices, including repositories of varying size as well as other memory components, and other devices that interface with the storage devices. In addition, the system may monitor all repositories, a subset or even a defined grouping of repositories. Using predictive tools or other determination (e.g., type of application, etc.), the system may identify a subset of repositories to monitor. The subset may indicate repositories that are at a high risk or perform critical operations. Other variations may be implemented to realize efficiencies.

At step 214, the Repository Monitoring Tool may determine an increase and/or variance of storage over a period of time. The monitoring tool may determine a consumption of storage, percentage of change (relative to a prior point in time), rate/speed of change, etc. The increase and/or variance in storage may be the result of storage actions involving artifacts, source code, text files, images, video, binary object, executables, etc. For example, an embodiment of the present invention may monitor historical data of each repository change to determine a percentage of change, how much storage is added per day (or other time period), how much storage is deleted per day (or other time period) as well as other actions taken or performed. Other metrics and/or activity may be measured and analyzed.

At step 216, the monitoring tool may identify one or more repositories with capacity exceeding the storage limit and exceeding consumption beyond normal/baseline parameters. An embodiment of the present invention is directed to identifying a culprit repository by identifier, name, location, etc. Additional information may include the types of actions taken by the identified repository, snapshot information, historical information, interactions with other components, rate of increase or decrease, etc. The system may also provide a mechanism for auto-control, simulation of events/actions, and other insights into the culprit repository etc. The system may also provide information relating to similarly situated repositories (e.g., performing the same/similar function at a different location, associated repositories performing related actions, etc.).

At step 218, the identified repository may be modified to a read-only state. An embodiment of the present invention may automatically apply a safeguard measure, which may include changing the state of the repository to a read-only state. This enables read functions to continue but prevents the repository from approaching maximum capacity. Other safeguard measures may include shutting down a repository, removing a repository, diverting access to another repository (e.g., back-up repository), etc. The type of safeguard applied may depend on the monitored data as well as the type of repository. For critical actions, the system may continue to access the repository to avoid any disruption of application execution and apply an action that removes non-critical storage and/or augments the repository storage. If more than one repository is identified, the system may apply the same safeguard measure or apply different levels of safeguarding depending on the level of consumption, criticality of the action and/or other factors. By limiting the safeguard action to the identified repository, the other repositories are not affected by the change in state.

At step 220, notifications may be generated and transmitted to one or more intended recipients. An embodiment of the present invention may identify one or more owners of the identified repository. For example, the system may identify one or more recipients of a communication and provide details of the culprit repository. The notification may include an electronic communication, link to information as well as communication via an interactive user interface. Other types of communication may be realized.

At step 222, an appropriate action may be applied. Upon notification, the system may automatically apply a set of actions to address the culprit repository. This may include a clean-up process, a deletion of data, etc. The system may also change the state of the repository, which may include reverting from read-only back to read-write, for example.

An embodiment of the present invention may also apply a prediction or optimization feature. For example, the system may monitor the repositories as well as other components and services associated with the entity to identify and/or predict a possible storage capacity issues. The system may recognize an incident in one application and predict similar issues in other related and/or similar applications. The system may also leverage data from external sources, e.g., blackout, data breach, etc. to predict and better prepare for data storage issues.

Figure 3:
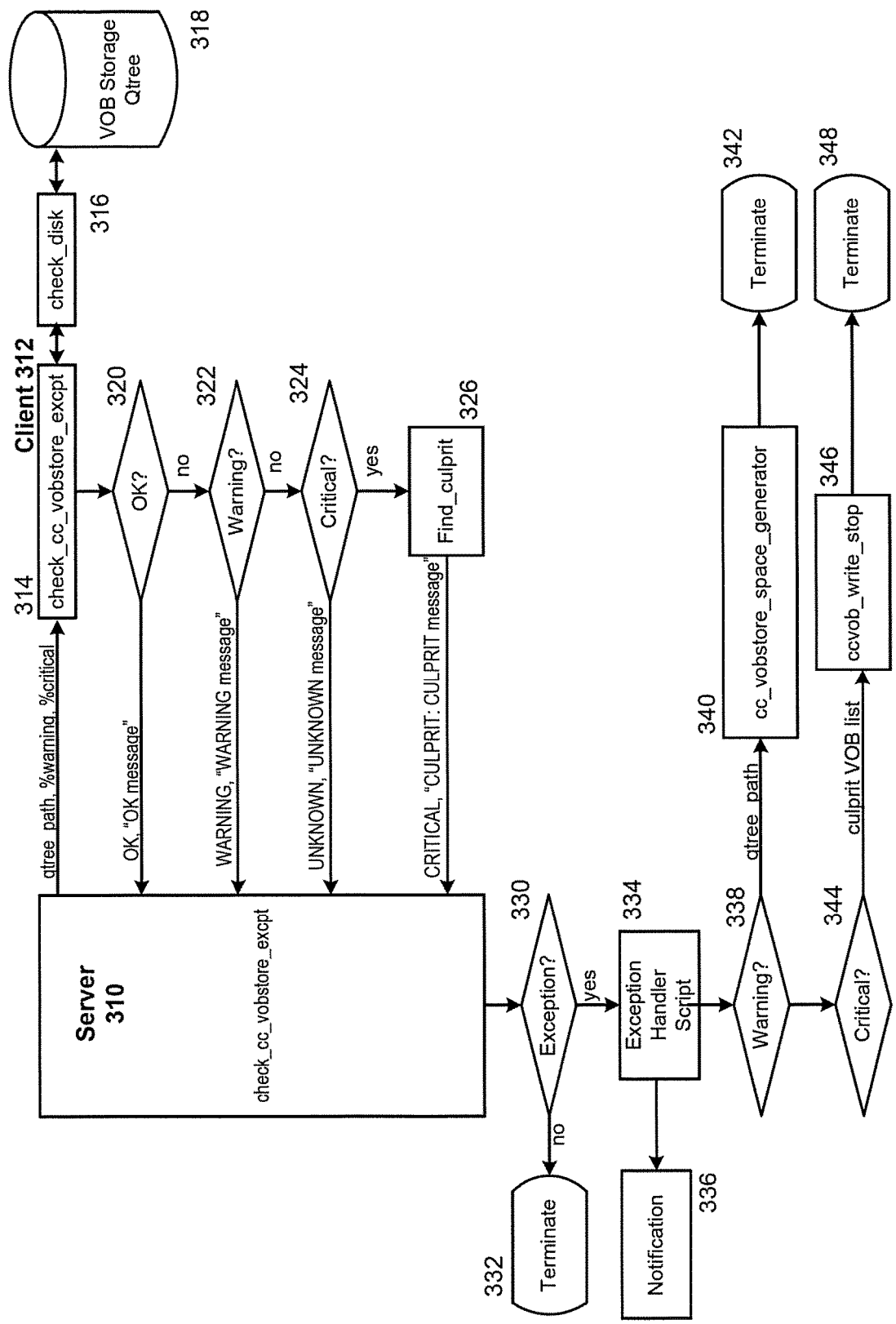
FIG. 3 is an exemplary flowchart of a method for implementing an Automated Monitoring Tool, according to an embodiment of the present invention.

FIG. 3 is an exemplary flowchart of a method for implementing an Automated Monitoring Tool, according to an embodiment of the present invention. As shown in FIG. 3, Server 310 may check a repository at 314 and specifically check disk storage at 316. Repository 318 represents a Storage Q Tree having a repository format. The repository format may be applied to any repository of binary code. In addition, the repository format may be applied across platforms with varying types of open source format and/or proprietary formats. Q Tree may represent a tree data structure where each internal node has multiple children nodes (e.g., N number of nodes). Other storage components, structures, repositories and file system storages may be monitored. Client 312 may determine if a storage level is below a threshold at 320 and return an OK message. Here, no alerts will be raised and no action needs to be taken. Client 312 may proceed to a warning determination at 322 and return a Warning message. The Warning message may notify teams that an alert is being addressed and assistance may be requested. A culprit script may find a repository format, if any, is causing the growth. Client 312 may proceed to a Critical determination at 324 and return a corresponding message. The Critical message may notify teams that an alert is being addressed and assistance may be requested. An alert may provide information about culprit formats. The culprit formats may be locked and later unlocked when any issues are resolved. At 326, the system may look into space files in the Q Tree and determine a list of possible culprit repositories. Client 312 may then communicate a Culprit message. Server 310 may determine whether an exception applies at 330.

For example, the exception may refer to a step to identify whether a storage has exceeded a configurable threshold storage limit (e.g., 80% utilization as a warning and 90% utilization as a critical). If no, then the script would terminate at 332. If yes, the system may execute an exception handler script at 334 and then proceed to transmit a notification at 336. In this example, if the utilization were greater than or equal to 80% utilization, the script would proceed with proactive measures with a notification and if critical, the script would remove write privileges to the offending repository or set of repositories. The system may make a warning determination at 338 and kick off a process to generate space stats for formats in the Q Tree at 340 and then terminate at 342. If the system makes a critical determination at 344, a culprit list may be identified at 346 and then terminate at 348. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

An embodiment of the present invention may execute a script that utilizes Server 310 to monitor repository formats as a potential cause for rapid Q Tree usage growth. When usage reaches a level, e.g., Warning or Critical, the system notifies an administrator via a notification, e.g., email or other communication. The script may identify specific formats responsible for the rapid growth.

FIG. 3 illustrates a specific implementation for illustration purposes. The embodiments of the present invention may be applied to various other systems and are not limited to the specific implementation of FIG. 3.

As shown in FIG. 3, the system monitors file system storage levels with the raising of alerts and damage prevention measures through event handling when exceptional warning and critical thresholds are breached. For example, Server 310 may be configured on a regular, predetermined schedule to monitor Q Trees and to raise warning and critical alerts when agreed disk usage levels are breached. The event handling mechanism may be configured to run scripts to perform certain actions in response. Actions may include determining culprit repositories, raise a notification alert and lock the culprit repositories.

According to an embodiment of the present invention, a script may be designed to be called when storage reaches a critical level and a number of different scenarios may have caused the storage to fill up. The script may check which scenario is at play and produce an appropriate output and exit status. Scenarios may include not enough growth in a period; no definite culprits determined and between one and three culprits consuming 80% of growth.

An embodiment of the present invention may monitor various systems, including Subversion (SVN) server and NAS Q trees, and further raise Warning and Critical alerts and generate notifications at 80% and 90% disk usage respectively. An embodiment of the present invention may keep the current checks as is, covering "Normal" circumstances, where staff are available to take preventative action, and augment these with checks covering "Exceptional" circumstances.

The "Exceptional" checks may use a similar disk space check to determine the Q Tree utilization, but at the Warning and Critical thresholds would run a find culprit script to determine a version object base (VOB) (or other repository format) growing at a fastest rate over a recent past, and return the culprit's identifier(s) as the exit status along with the exit code from the disk space check.

A server may be configured with event handling enabled, and configured to call an event handling script immediately e.g., on first check attempt, when its status changes state from "OK" to "Warning" or "Critical."

An event handling script (cc_store_excpt_eh.sh), when called, gets passed the same arguments as were passed to the check, e.g., the warning and critical thresholds, and the store path; as well as the exit status and code that the check returned. The event handling script may take action on exit codes Warning and Critical only. And, no action is taken on OK and Unknown.

An exemplary illustration may involve a VOB Storage Q Tree; however other repository formats may be implemented. For the Warning exit code, the script kicks off the VOB space generation script on the VOB storage area (refer to script: cc_vobstore_space_generator.sh), composes the appropriate "warning" message, detailing the VOB storage area, and raises a notification call with the message. The person(s) on-call at that point, on receiving the call, may then investigate the situation, and take steps to rectify the problem.

For the Critical exit code, the script locks the Culprit VOB(s) passed to it (e.g., refer to script: cc_vob_write_stop.sh), before then composing the appropriate "critical" message and notification call. The server check also raises email notification for the state changes in the usual way.

FIG. 4 illustrates an exemplary interactive interface, according to an embodiment of the present invention. An interactive interface, as represented by Repository Monitor Interface 410, of an embodiment of the present invention may display Repositories 412, Consumption History 414 and Activity History 416. Graphic 418 may provide illustrations, heat maps and/or other interactive interface related to historical data for one or more repositories. For example, Graphic 418 may provide a heat map of directories and files that are being used and how some are changing at a higher frequency. This may indicate a possible error. In response, the system may enable the user to make modifications, which may include revising code or scripts to avoid certain flagged actions. Based on the data presented, a user may make modifications at 420.

A user may view one or more repositories that exceed a consumption threshold at 412. Consumption History 414 may provide consumption data over a period of time. In addition to consumption data, the Interface may provide activity information through Activity History 416. An embodiment of the present invention may provide activity data relating to revisions history. For example, a repository may be at revision 100, and then revision 150 in a few days. The revision history data combined with the consumption data may be informative. In addition, the system may determine the type of activity. For example, if a particular UI has had changes to user input fields, this may be considered a low risk activity. Conversely, if changes are being made to an underlying sequence scripts that are changing table formats, dropping tables and creating tables, this may be considered a higher risk activity. The activity information may also be compared to other repositories so that any outlier activity may be easily identified and detected. This may also be displayed in a graphical format at 418.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system that implements an automated repository monitoring tool, the system comprises:
a plurality of repositories that are accessed by one or more applications;
an interactive interface that receives one or more user inputs and displays repository monitor data; and
a processor coupled to the interactive interface and configured to perform the steps comprising:
identifying a storage limit for the plurality of repositories;
identifying a set of repositories with capacities exceeding the storage limit;
monitoring the set of repositories for storage consumption;
calculating, for each of the set of repositories, a rate of change in storage consumption by determining a variance amount in the storage consumption for each of the set of repositories for a predetermined time period;
identifying one or more repositories for which the rate of change in storage consumption exceeds a predetermined parameter;
identifying at least one culprit repository from the one or more repositories based on the rate of change in storage consumption;
automatically modifying a first state of the at least one repository to a safeguard state; and
generating a notification to one or more recipients responsible for the at least one repository.

2. The system of claim 1, wherein the storage limit is set by a user.

3. The system of claim 1, wherein the monitoring a set of repositories further comprises monitoring activity history.

4. The system of claim 3, wherein the activity history comprises revision history.

5. The system of claim 1, wherein the variance amount in the storage consumption comprises an increase in artifact uploading.

6. The system of claim 5, wherein the artifact uploading relates to one or more of source code, text files, images, binary objects and executables.

7. The system of claim 1, wherein the step of identifying at least one culprit repository further comprises identifying a repository name and location.

8. The system of claim 1, wherein the safeguard state comprises a read only state.

9. The system of claim 1, wherein the processor is further configured to perform:
automatically reverting the at least one repository to the first state.

10. The system of claim 1, wherein the user interface generates and displays an interactive graphic that illustrates consumption history and activity history for one or more repositories.

11. An automated computer implemented method that implements an automated repository monitoring tool, the method comprising the steps of:
identifying a storage limit for a plurality of repositories that are accessed by one or more applications;
identifying a set of repositories with capacities exceeding the storage limit;
monitoring the set of repositories for storage consumption;
calculating, for each of the set of repositories, a rate of change in storage consumption by determining a variance amount in the storage consumption for each of the set of repositories for a predetermined time period;
identifying one or more repositories for which the rate of change in storage consumption exceeds a predetermined parameter;
identifying at least one culprit repository from the one or more repositories based on the rate of change in storage consumption;
automatically modifying a first state of the at least one repository to a safeguard state; and
generating a notification to one or more recipients responsible for the at least one repository.

12. The method of claim 11, wherein the storage limit is set by a user.

13. The method of claim 11, wherein the step of monitoring further comprises monitoring activity history.

14. The method of claim 13, wherein the activity history comprises revision history.

15. The method of claim 11, wherein the variance amount change in the storage consumption comprises an increase in artifact uploading.

16. The method of claim 15, wherein the artifact uploading relates to one or more of source code, text files, images, binary objects and executables.

17. The method of claim 11, wherein the step of identifying at least one culprit repository further comprises identifying a repository name and location.

18. The method of claim 11, wherein the safeguard state comprises a read only state.

19. The method of claim 11, further comprising the step of:
automatically reverting the at least one repository to the first state.

20. The method of claim 11, further comprising, providing, via a user interface, an interactive graphic that illustrates consumption history and activity history for one or more repositories.

* * * * *